W. D. HICKS.
LATH.
APPLICATION FILED DEC. 8, 1919.
1,430,080.
Patented Sept. 26, 1922.
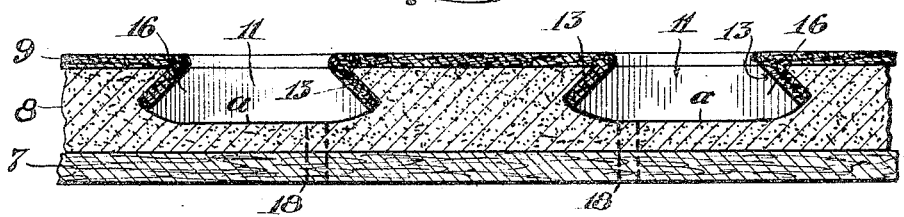
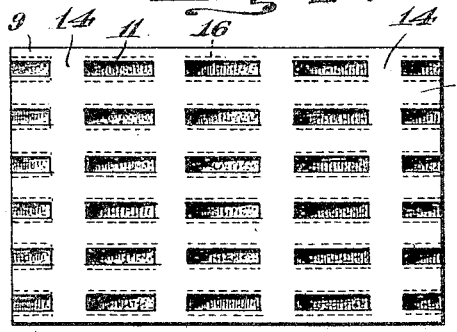
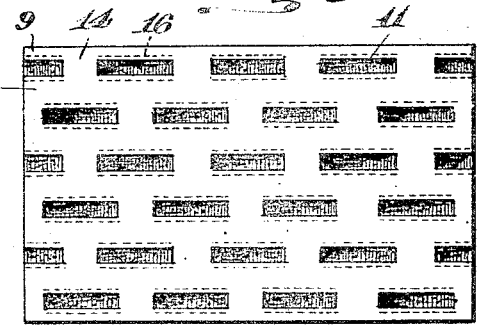
INVENTOR
WILLIAM D. HICKS;
BY
ATTORNEY Patented Sept. 26, 1922.

1,430,080

UNITED STATES PATENT OFFICE.

WILLIAM D. HICKS, OF LOS ANGELES, CALIFORNIA.

LATH.

Application filed December 8, 1919. Serial No. 343,226.

*To all whom it may concern:*

Be it known that I, WILLIAM D. HICKS, a citizen of the United States, residing at Los Angeles, in the county of Los Angeles and State of California, have invented new and useful Improvements in Laths, of which the following is a specification.

This invention relates to a lath and particularly pertains to a composition lath.

It is the object of this invention to provide a lath in the form of a wall board adapted to be manufactured in comparatively large sheets and so formed as to possess considerable rigidity and not bend in handling, and so reinforced as not to be readily broken.

Another object is to provide a rigid composition slab or board having recesses or depressions on its outer face adapted to receive and form a key for plaster, and in which the recesses or depressions are so formed and arranged as not to materially weaken the board.

Another object is to provide a composition board with dove-tailed channels to form plaster keys, in which the edges and sides of the channels are covered and reinforced by a surfacing sheet material, while the bottom wall of the channels will be formed of a plastic material to which plaster will readily adhere.

Another object is to provide a combined wall board and lath to adapt it for use in forming either a smooth wall surface in itself or as a lath to receive a finish coating of plastic material.

Another object is to provide a composition wall board and lath which is not liable to warp or become distorted on the application of wet plaster.

Other objects will appear hereinafter.

The invention is illustrated in the accompanying drawings in which:—

Figure 1 is a view illustrating the recesses or depressions, as formed with a dovetailed cross section;

Figures 2 and 3 are views in elevation showing the plaster receiving face of the lath board and illustrating the preferred arrangements of the plaster receiving recesses;

Figure 4 is a detail in elevation, illustrating a modified form of the recesses.

In carrying out my invention, I employ a backing sheet 7 of any suitable description, preferably formed of paper such as heavy card-board, and a body of plastic material 8 of any suitable character is placed thereon and leveled off to a desired thickness. The outer surface of the plastic material is covered with a facing sheet 9, which is preferably of waterproof character such as paper treated with tar, creosote, paraffin, or other waterproof and preservative substances, which facing sheet is pressed on the plastic material while the latter is soft.

The facing sheet 9 is formed with slits either before or after its application to the plastic body, the edges of which slits are pressed downwardly into the plastic to form recesses or depressions 11 lined with flap portions 13 of the surfacing sheet, as shown in Figure 1. The recesses or depressions 11 may be of any suitable length but are preferably about three inches long and spaced apart throughout the sheet, and may be formed in alined rows as shown in Figure 2 or staggered as shown in Figure 3, so as not to form continuous channels across the board and to provide partitions 14 between the ends of adjacent depressions and partitions 15 between adjacent rows of depressions so as to stiffen the board both longitudinally and transversely.

The side walls of the recesses or depressions together with the covering flaps 13 may be pressed backwardly so as to incline the side walls of the recesses or depressions in opposite directions, thereby forming the recesses or depressions with dovetailed cross sections, as particularly shown in Figure 1. The body of plastic 8 is of such thickness, and the flaps of such size that when the latter are turned downwardly into the plastic the edges of the flaps will extend only part way through the plastic body, so that the bottom walls "$a$" of the recesses will be formed of a relatively thin body of the plastic which will be supported by the backing sheet 7.

This construction affords an effective key and binder for plaster which may be spread on the facing sheet 9 when the board is in place, as is common in plastering operations; a key for the plastering being formed in the channels 16 extending beneath the edges of the recesses or depressions.

The waterproof character of the facing sheet 9 serves to obviate warping of the board on applying wet plaster thereto and the sheet 7, forming a facing for the opposite side of the board, serves as a protection to the plastic in handling the board and also acts as a reinforcement to stiffen the board. It also provides a finish for one side of the board to adapt it to be used as a wall surface where it is not desired to apply plaster.

The recesses or depressions are preferably made of rectangular form, as shown in Figures 4 and 5, but obviously may be of any other desired outline, as for example, they may be formed diamond shaped, as indicated at 17 in Figure 6.

By forming the sheet with the vertically disposed partitions 14 between adjacent depressions and forming apertures through the bottom walls of the depressions on the opposite sides of the partitions as indicated in dotted lines at 18 in Figure 1.

From the foregoing it will be seen that I have provided a composition lath board having a plaster receiving face formed with recesses or depressions extending only partly through the board with the body of the plastic composition of which the board is formed exposed throughout a large area of the recesses or depressions. By forming the recesses or depressions with uncovered or exposed areas of plastic, the plastic by reason of its porous and absorptive qualities will effect a suction action on the fresh plaster applied thereto, so that the plaster will readily adhere to the plastic walls of the recesses or depressions and cling to the lath while soft.

I claim:

1. In a composition lath board, a plastic body, a facing sheet covering same, and depressions in said plastic body having side walls lined with said facing sheet and the bottom wall exposed, throughout a major portion of the depression.

2. In a composition lath, a plastic body, a backing sheet covering one side thereof, and a waterproof facing sheet covering the opposite side of said plastic body, said plastic body being formed with depressions through said last named sheet having opposite side walls lined with said sheet, the bottom walls of said depressions being exposed throughout a major portion thereof.

3. In a composition lath board, a plastic body, a facing sheet covering same, and depressions in said plastic body having side walls lined with said facing sheet and the bottom wall exposed throughout a major portion thereof, said depressions being formed with dovetailed cross sections.

4. In a composition lath, a plastic body having a series of spaced depressions formed therein, said depressions having inwardly inclined side walls to form the depressions with dovetailed cross sections, and a facing sheet covering said plastic body having portions thereof turned downwardly and covering the inclined walls of said depressions; and terminating at the bottom walls of said depression.

5. In a composition lath board, a plastic body having depressions formed in one face thereof extending partly therethrough, and a facing sheet covering the recessed face of said plastic body having openings formed therein registering with said depressions and having portions extending over the side walls of the depressions and terminating at the bottom walls of said depressions.

6. In a composition lath board, a plastic body, and a facing sheet on said plastic body having portions pressed into the plastic body forming recesses in the latter extending partly therethrough and forming the recesses throughout with bottom walls of plastic.

7. A composition lath board comprising, a plastic body, formed with a series of plaster receiving recesses, and a facing sheet covering said plastic body having openings opposite the recesses; said recesses having exposed areas throughout a major portion of the walls thereof to present porous and absorptive surfaces.

8. A composition lath board comprising a plaster body having a series of recesses formed therein arranged in rows with a plurality of recesses in each row, and a facing sheet on said plastic body having perforations formed therein registering with said recesses, said sheet being formed with flaps on the margins of said perforations and said flaps extending into said recesses on the side walls thereof and terminating in spaced relation to each other to expose the plastic on the bottom walls of the recesses.

9. A composition lath board comprising a plastic body having a series of recesses formed therein, and a facing sheet on said plastic body having perforations formed therein registering with said recesses, said sheet being formed with flaps on the margins of said perforations, and said flaps extending into said recesses on the side walls thereof and terminating in spaced relation to each other to expose the plastic on the bottom walls of the recesses.

10. A composition lath board comprising a body provided with a facing sheet formed with a perforation having flaps on its margins, said body being formed with a recess registering with the perforation, and said flaps being turned to extend over the opposite side walls of the recess and terminating in spaced relation to each other.

11. A composition lath board comprising a plastic body formed with a recess having bottom, side and end walls, a facing sheet covering the surface of the body between the recesses, and a covering on the side walls of the recesses, terminating at the bottom and end walls of said recesses.

WILLIAM D. HICKS.